(12) United States Patent
Khang (10) Patent No.: US 7,152,098 B2
(45) Date of Patent: Dec. 19, 2006

(54) INTERNET BROADCAST SYSTEM

(75) Inventor: Vu Tien Khang, Howald (LU)

(73) Assignee: SES Astra S.A., Chateau de Betzdorf (LU)

( * ) Notice: Subject to any disclaimer, the term of this patent is extended or adjusted under 35 U.S.C. 154(b) by 387 days.

(21) Appl. No.: 10/409,737

(22) Filed: Apr. 9, 2003

(65) Prior Publication Data

US 2003/0236908 A1      Dec. 25, 2003

Related U.S. Application Data

(63) Continuation of application No. PCT/EP00/09894, filed on Oct. 9, 2000.

(51) Int. Cl.
*G06F 13/00* (2006.01)

(52) U.S. Cl. .................................. 709/219

(58) Field of Classification Search ............ 709/203, 709/219; 707/10
See application file for complete search history.

(56) References Cited

U.S. PATENT DOCUMENTS

| 5,404,505 A * | 4/1995 | Levinson ............... 707/10 |
| 5,724,521 A | 3/1998 | Dedrick |
| 5,732,216 A | 3/1998 | Logan et al. |
| 5,790,935 A | 8/1998 | Payton |
| 5,893,091 A | 4/1999 | Hunt et al. |

FOREIGN PATENT DOCUMENTS

| GB | 2 344 009 A | 5/2000 |
| WO | WO 93/09631 A1 | 5/1993 |
| WO | WO 97/50250 A1 | 12/1997 |

\* cited by examiner

*Primary Examiner*—Robert B. Harrell
(74) *Attorney, Agent, or Firm*—Wolf, Greenfield & Sacks, P.C.

(57) ABSTRACT

The invention refers to a system for distributing data from a transmission station to a plurality of user stations over a transmission channel having a predetermined bandwidth. In order to provide internet services to the end user via a single direct-to-home satellite transmission channel, the transmission channel comprises a contents channel and an announcement channel, wherein the transmission station transmits over the contents channel a data subset within a certain period and transmits over the announcement channel an index of future data subsets to be transmitted, and wherein a user profile is stored in each user station characterizing the relative importance of topics of interest to the user and wherein the user station downloads data subsets from the transmission channel in accordance with the quality of matching between the index of the announcement channel and the user profile.

32 Claims, 9 Drawing Sheets

INTERNET BROADCAST SYSTEM

This application is a continuation of prior PCT Application No. PCT/EP00/09894, filed on Oct. 9, 2000, entitled INTERNET BROADCAST SYSTEM.

FIELD OF THE INVENTION

The invention refers to a system for distributing data from a transmission station to a plurality of user stations over a transmission channel having a predetermined bandwidth. Furthermore, the invention refers to a transmission station, a user station, a transmission method, a receiving method and a method for distributing data.

BACKGROUND OF THE INVENTION

In view of the increasing importance of Internet services and the increasing demand for high-speed access to Internet data, the use of a DTH (Direct To Home) satellite broadcasting system might be advantageous to enable Internet access to a plurality of users. Indeed, a DVB (Digital Video Broadcast) satellite may deliver data at very high speed (up to 38 Mbps) to all users equipped with an antenna of a diameter as small as 50 cm, requiring them to use only a slow-speed terrestrial modem as a return channel.

However, a further analysis of the available bandwidth and the amount of data to be transmitted shows that unicast applications with one-to-one connections do not scale well when used in a satellite broadcasting environment. For example, if 70 kbps as a minimum transmission speed are considered as "high-speed" Internet and if an overlapping factor of 10 (the overlapping factor corresponds to the data which are accessed or demanded simultaneously by the users) is applied in a subscriber market addressing end consumers, the following figures may be obtained:

| | |
|---|---|
| 10 subscribers | 70 kbps |
| 100 subscribers | 700 kbps |
| 1,000 subscribers | 7 Mbps |
| 10,000 subscribers | 70 Mbps or 2 transponders |
| 100,000 subscribers | 20 transponders |
| 1 million subscribers | 200 transponders. |

Even if an overlapping factor of 200 instead of 10 (20 times the previous figures) is assumed, as some Internet providers apply to a population over 500,000 home subscribers, still around 100 transponders are needed to serve only 10 million homes. Hence, a direct application of a satellite broadcasting transmission channel seems to be unsuitable for distributing Internet data to end users.

SUMMARY OF THE INVENTION

Therefore, it is an object of the invention to provide internet services to the end user via a transmission channel having a predetermined bandwidth, which allows several competing technologies and implementations to co-exist.

This object is solved by the features of the claims.

The inventive solution is based on the cognition that the data to be distributed are not offered at once to all end users, but are transmitted consecutively in data subsets. In order to achieve this goal, the transmission channel comprises besides a contents channel an announcement channel over which an index of future data subsets is transmitted. This index allows the end user to automatically download the data subsets of interest and to estimate the delay of transmission to the next data subset of interest. This principle can be compared with the transmission of television data over a broadcast channel. Equally, the amount of television data is too much to be transmitted at once to all end users. Instead, certain data subsets (normally a few television channels or television movies) are transmitted at once. In television broadcasting there is also an "announcement channel", namely the television program for the next weeks which is published in several television magazines. From this information the user can also automatically download certain television movies on his video tape by programming his video tape accordingly.

A system formed in accordance with the invention has a number of advantages. First of all, a large user base can be acquired on a worldwide basis, so that an advertisement paid and free access system can be achieved. Furthermore, the approach according to the invention introduces new sophisticated media to the end user which will stimulate the multimedia market even further.

In accordance with one aspect of the invention, the transmission channel is a satellite broadcast channel. Furthermore, the data to be distributed are Internet data and/or multimedia data.

In accordance with another aspect of the present invention, the user station is a computer or any other electronic appliance with equivalent capabilities comprising a receiving equipment for receiving the transmission channel, wherein the receiving equipment automatically downloads the required data subset in accordance with the user profile.

According to another aspect of the present invention, a return channel is provided from at least some of the user stations to the transmission station for enabling the corresponding user to exchange data interactively. For example, it is then possible for the user to perform some searching in the Internet or to do some interactive transaction in e-commerce. The return channel can be a slow terrestrial phone modem, ISDN, cable modem, xDSL, or can be also a satellite return channel, if necessary. In particular, as a return channel also any Internet link can be used. According to another aspect of the present invention, a vote channel is provided from at least some of the user stations to the transmission station for enabling the user to transmit a vote for a specific data subset to the transmission station, wherein a selection unit is provided in the transmission station for selecting the next data subset to be transmitted in accordance with the received votes. "Voting" in the sense of the present invention means to influence the data subsets to be transmitted next. A vote of a user will be included in the competition process for the bandwidth of the contents channel in the future rounds of webcasting. The most popular data subsets will win and will be included in the next transmission round. Advantageously, the vote channel is part of the return channel and/or preferably the vote channel is a telephone line. Alternatively, the vote channel is constituted by an Internet link in several layers.

According to a further aspect of the present invention, a payment channel is provided between at least some of the user stations and the transmission station.

An additional payment channel gives further possibilities for e-commerce and might satisfy specific needs, as for example:

webcast channels covering very specialized subjects (4×4 recreational vehicles, antiques cars, offshore motor boats, sailboats, . . . ) where voting is still free when bandwidth is available, and where paid votes have priority over free votes;

auctionable priority on sites with audio/video streams, where people would accept to auction some amount of micro-payment if the content they asked for is webcasted in a short delay;

combination of webcast and e-commerce sites, where people would consult specific catalogue pages with detailed QuickTime-3D models of furniture and goods, Java applets displaying clothes on live mannequins, videos of sports and animation holiday resorts, before they make a purchase decision on-line;

pre-view sites where people may pre-view audio/video contents before they buy on-line and are webcast delivered.

Advantageously, the payment channel can also be part of the return channel and/or preferably is a telephone line.

Alternatively, the payment channel is constituted by an Internet link in several layers.

In accordance with the above-mentioned needs which can be fulfilled by the payment channel, an evaluation unit is provided in the transmission unit for evaluating a certain payment. Accordingly, a vote-related payment gives a specific vote of the user priority over free votes. Furthermore, a bandwidth-related payment decreases the transmission delay for requested data to be transmitted.

In order to offer even sophisticated usage, the transmission channel might comprise a service channel which connects an encoder in the transmission station and a decoder in a user station. The decoder might be a so-called "set-top box", providing a combination of free services and paid services or services on demand. Preferably, the service channel is only accessible after a certain payment for requesting and/or receiving on-demand services. The payment can be carried out via the above-mentioned payment channel or can be fulfilled by the transaction of a lump sum.

According to another aspect of the present invention, an auxiliary channel is provided for alternatively distributing data to a user station which cannot be distributed over the transmission channel due to limited bandwidth. Assuming the distribution of Internet data, the auxiliary channel can be a telephone line to the corresponding Internet Service Provider. The auxiliary channel gives then a backup possibility to access Internet data which are not available in the local storage of the user and are not being ready to be fetched from the contents channel. Preferably, a local advisor application is provided in the user station for managing the data access to show the users which data are available on the local cache, which data are not on the local cache, but are in the announcement channel ready to be fetched, and which data have to be downloaded from the auxiliary channel.

The invention comprises also a transmission station for distributing data, a user station for receiving data, a method for distributing data, a transmission method for distributing data and a receiving method for receiving data, for which individual protection is sought. It is understood that all aspects of the invention as described above also fully apply to these subject matters.

BRIEF DESCRIPTION OF THE DRAWINGS

Other objects and features of the invention will become apparent by reference to the following specification and to the drawings in which.

DETAILED DESCRIPTION

Figure 1:
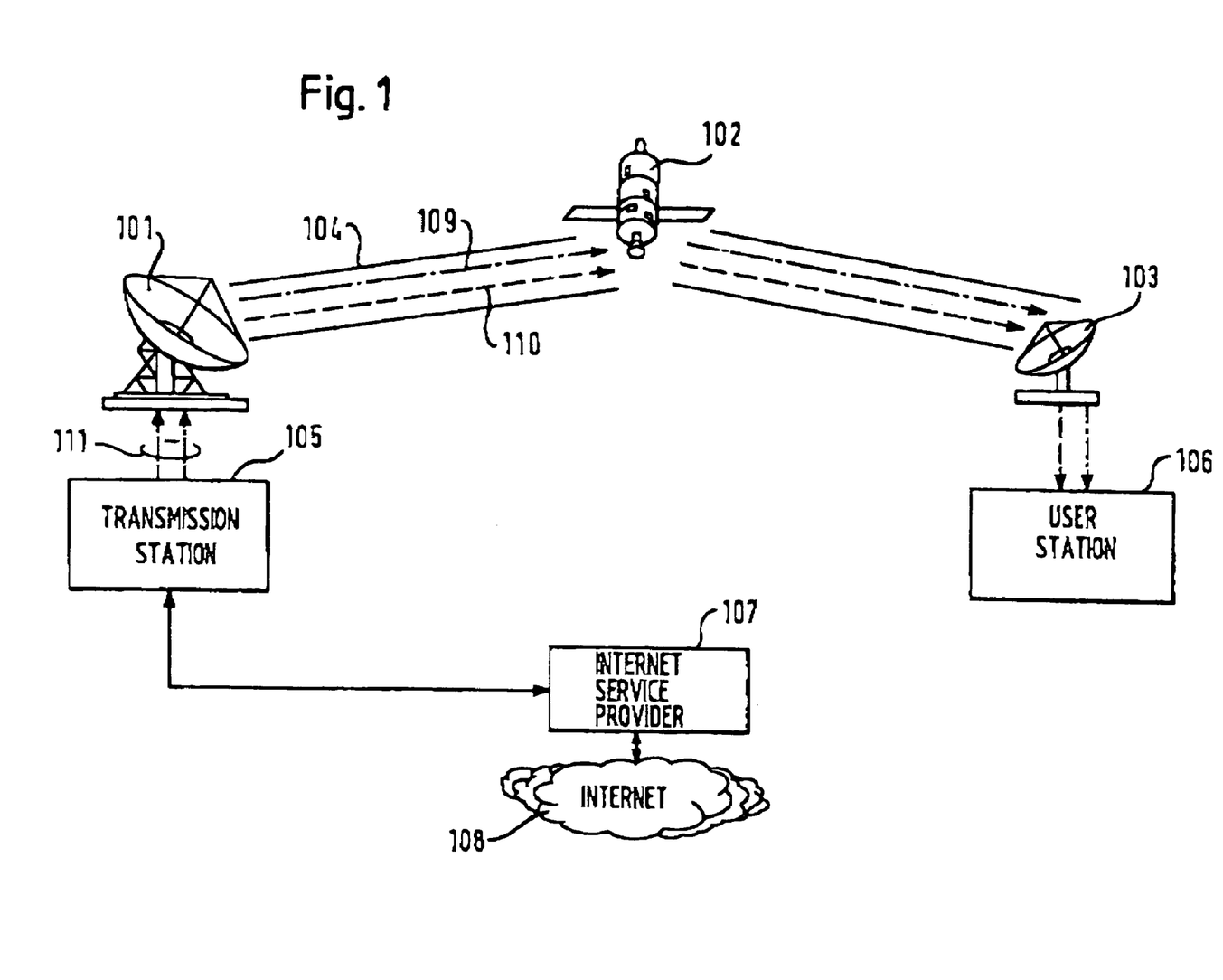
FIG. 1 shows a schematic diagram of a first embodiment of the invention.

FIG. 1 shows a schematic diagram of a first embodiment of the invention. A transmission station 105 is connected with satellite transmission antenna 101 for distributing data 111 over a transmission channel 104. The uplink data of the transmission channel 104 are received by a satellite transponder 102 and are sent back to a region of interest on earth for reception by a user station 106. The user station 106 is connected to a satellite receiver comprising a receiving antenna 103 having a diameter of about 50 cm. The transmission station is connected to an Internet Service Provider 107 which gives access to Internet data 108. Naturally, the transmission station 105 and the Internet Service Provider 107 can be merged to one single unit, if this is advantageous. Furthermore, the user station might be simply a home PC in which a DVB satellite reception card is installed.

According to the invention, the transmission channel 104 comprises two channels, namely a contents channel 109 and an announcement channel 110. Over the contents channel 109 Internet data are transmitted which are currently selected by the transmission station 105, wherein over the announcement channel 110 an index is transmitted containing description of future data subsets to be transmitted over the contents channel 109. A local advisor application might be installed in the user station for managing the reception of certain Internet data and for specifying the user profile, for example by dragging-and-dropping some icons in a bucket. The local advisor application uses this information in association with descriptions in the announcement channel to select from the contents channel the Internet pages which are closest to the interest of the user and stores them in the local storage of the user station 106. The local advisor application automatically displays clickable links to pages already available locally in the user station 106 or warns about pages that are announced, but are not yet received. The local advisor application is actually a personal meta-search tool that operates on the PC local storage space and searches in pages described in advance in a multicast announcement channel.

The local advisor application updates also updates continuously the user profile of the user on the basis of keywords which have been recently used for a search in the Internet and/or the description of the contents that was captured and watched.

Since the transmission as shown in FIG. 1 is mainly supposed to be an open source transmission to be received by everyone, payment has to be achieved by advertisements. In this connection, the local advisor application installed on the user station 106 can also be used to display an advertisement which fits ideally to the user profile. This advertisement was also webcasted via the contents channel 109 and was selected from other advertisements for local storage in the user station 106 similar to the selection of the Internet pages as described above.

All in all, the situation according to FIG. 1 offers a usage of the transmitted Internet data without any return channel, so that the reception is purely passive. All intelligence and selection of the Internet data happens locally. The user is free to remain unknown to the webcaster of the transmission station 105, but can only consult web pages that are decided for webcasting by the transmission station.

Figure 2:
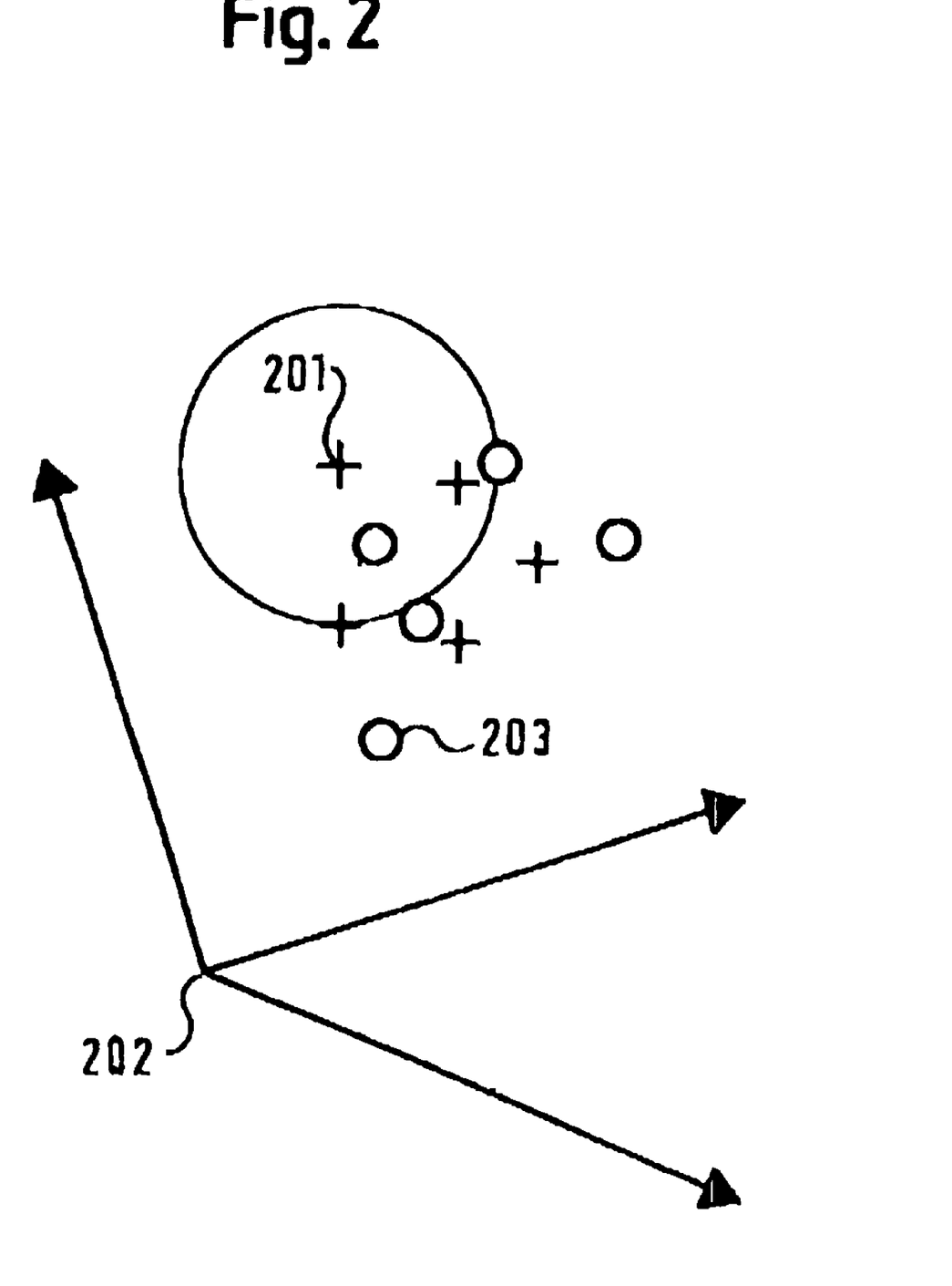
FIG. 2 shows the principle for appointing a user profile.

FIG. 2 shows the principle for appointing a user profile according to the invention. As described above, a local advisor application might be installed in the user station 106 in order to automatically select the Internet pages that are of interest to the user. Conversely, the transmission station 105 has to perform a selection of those Internet pages to be transmitted which are of interest to the maximum number of users.

In order to perform these kinds of selections, a proximity measurement is performed in a multi-dimensional vector space 202. Each end user is represented by a point 201 whose coordinates in the multi-dimensional vector space 202 weighs the preferences of this end user for a set of keywords. Each Internet page may also be represented by another point 203 in the same hyper space 202. Examples of keywords could be "business", "tourism" etc.

When a sphere is drawn around a point 201 which represents an end user, all the web pages represented by points that are enveloped inside the sphere are "close" enough to this end user to be able to interest him. Conversely, if a sphere is drawn around a point 203 which represents an Internet page, the more user points it manages to enclose, the more people may be interested in receiving this Internet page and the more cost-effective it becomes to broadcast such an Internet page.

Figure 3:
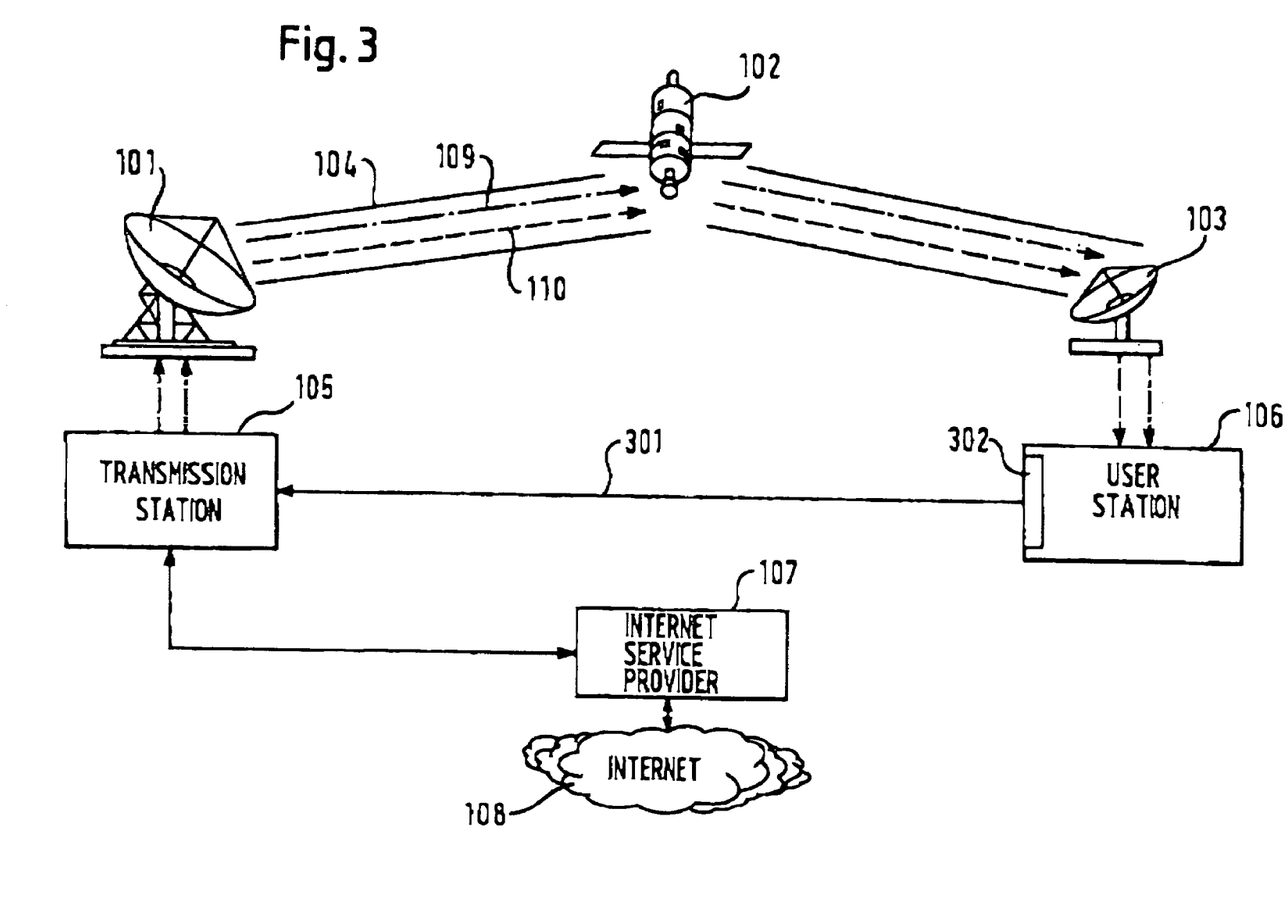
FIG. 3 shows a schematic diagram of a second embodiment of the invention.

FIG. 3 shows a schematic diagram of a second embodiment of the invention. The difference to the first embodiment is that a return channel 301 is provided from the user station 106 to the transmission station 105, wherein a local modem 302 is installed in the user station for this purpose. The webcaster in the transmission station 105 might provide special services for the return channel 301 in order to communicate interactively with the Internet pages received via the contents channel 109. In particular, e-commerce interactive transaction might be performed via the return channel 301.

Figure 4:
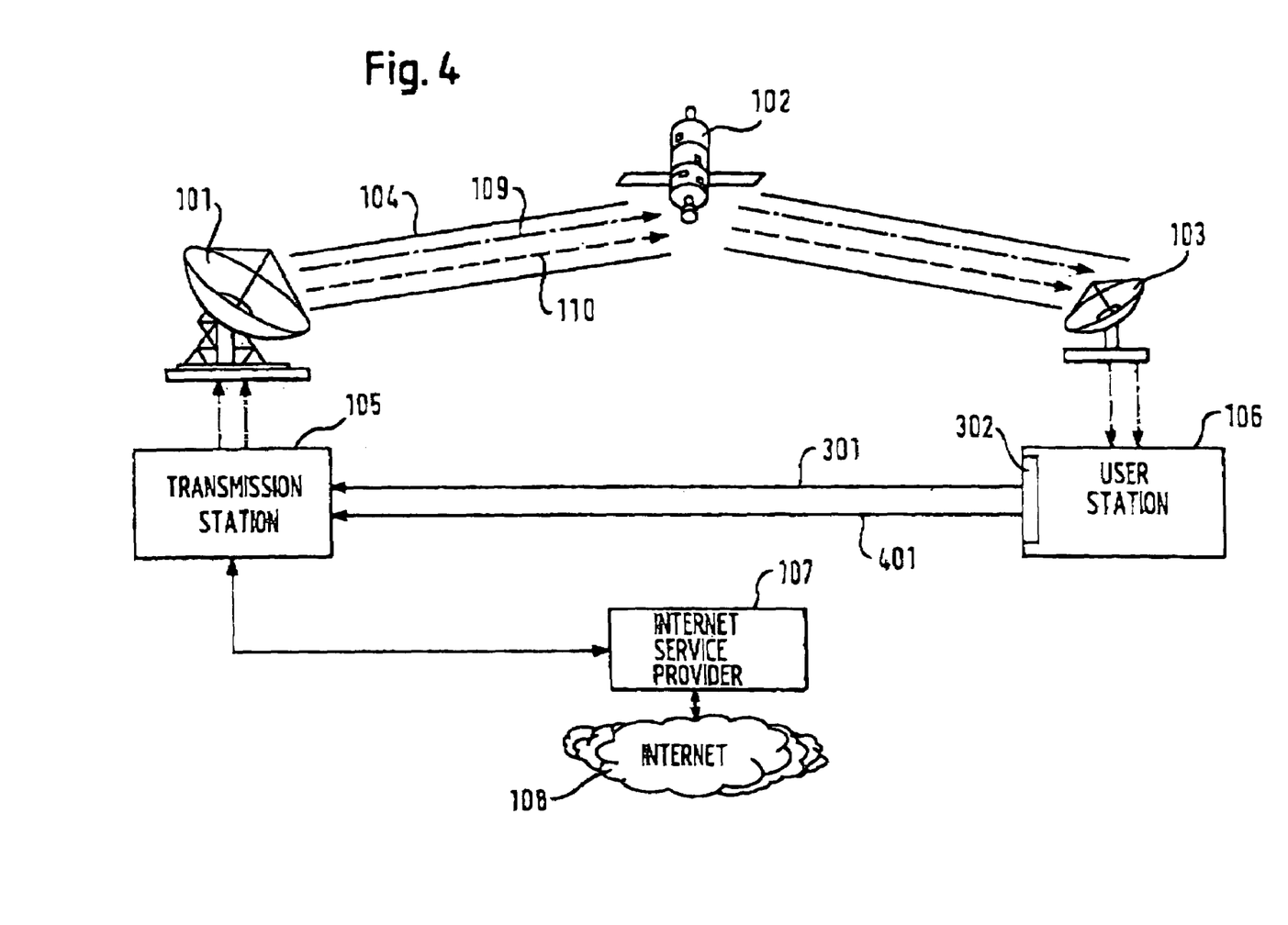
FIG. 4 shows a schematic diagram of a third embodiment of the invention.

FIG. 4 shows a schematic diagram of a third embodiment of the invention. The difference with regard to the second embodiment according to FIG. 3 lies in the fact that additionally a vote channel 401 is provided between the user station 106 and the transmission station 105. In practice, the return channel 301 and the vote channel 401 might be merged in one telephone connection line. The vote channel 401 enables the user to "vote" for Internet pages found on the Internet by the local advisor application. The voted page will be included in the competition process for bandwidth selection in the transmission station 105, wherein the most popular Internet page will win the transmission in the future rounds.

The deal that may be proposed to the user is as such:
1. You contribute by your vote to the knowledge to the webcaster in the transmission station, and as a return voting is free to you;
2. However, to prevent hackers to vote repeatedly thousands of times for the same web page, we need to give you a personal login and password to identify your vote; this identification will not be revealed to anyone;
3. You may always choose to vote anonymously, but if you also provide your centres of interest when voting, then your vote will be given more weight than any anonymous vote, as a vote for a travel page coming from someone interested in travelling is likely to be more focused (your centres of interest is updated automatically by your local advisor application);
4. Your personal centres of interest (your privacy) will not be given to anyone and will be used only for a statistical aggregation count of the population's main interests.

Figure 5:
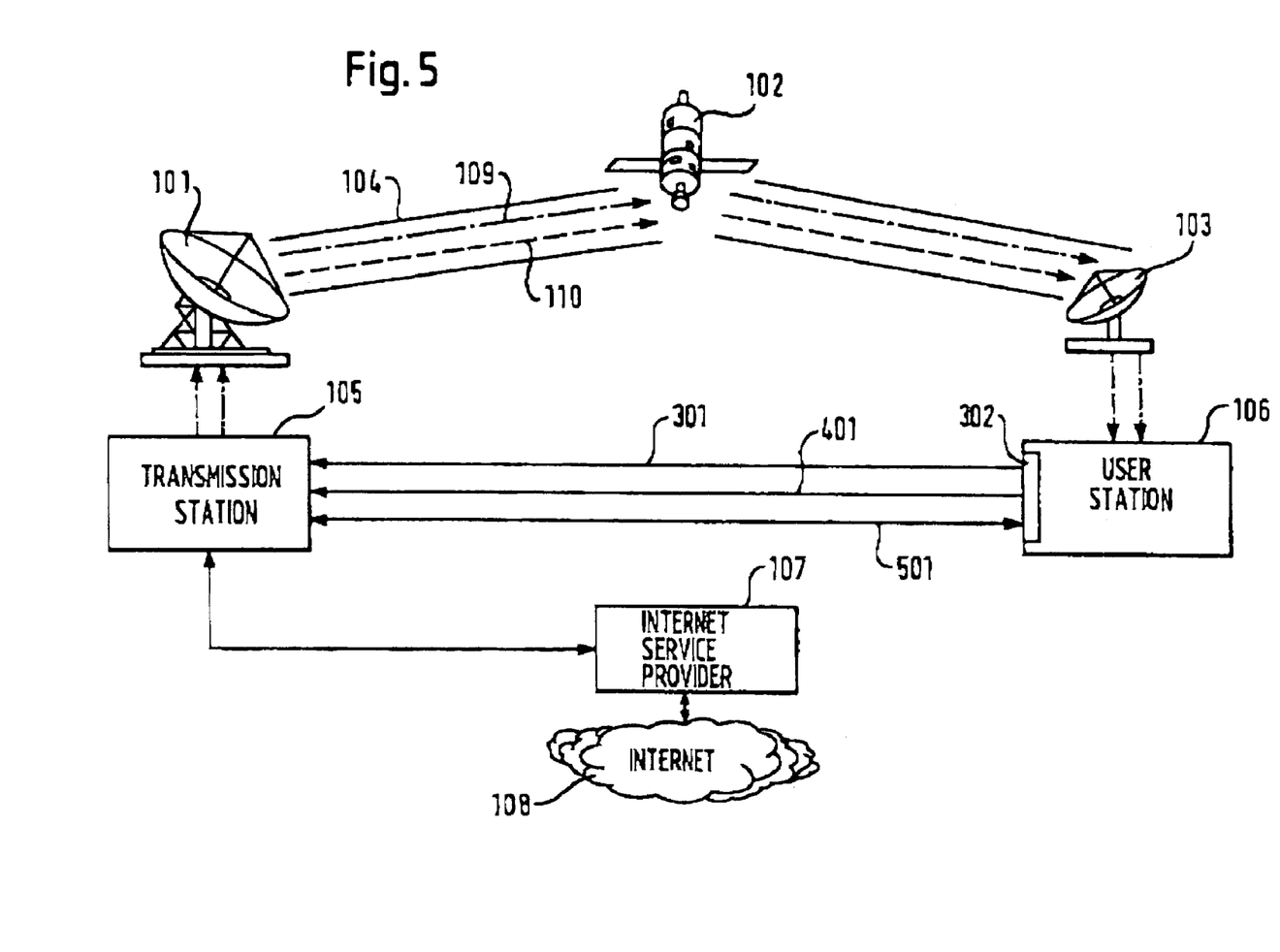
FIG. 5 shows a schematic diagram of a fourth embodiment of the invention.

FIG. 5 shows a schematic diagram of a fourth embodiment according to the invention. The difference with regard to the third embodiment is that a payment channel 501 is additionally provided between the user station 106 and the transmission station 105. The payment channel 501 is designed bi-directional and might be realized in practice by one telephone line together with the return channel 301 and the vote channel 401. The payment channel 501 can be used by the user to obtain some dedicated services and to specify specific needs as for example:

webcast channels covering very specialized subjects (4×4 recreational vehicles, antiques cars, offshore motor boats, sailboats, . . . ) where voting is still free when bandwidth is available, and where paid votes have priority over free votes;

auctionable priority on sites with audio/video streams, where people would accept to auction some amount of micro-payment if the content they asked for is webcasted in a short delay;

combination of webcast and e-commerce sites, where people would consult specific catalogue pages with detailed QuickTime-3D models of furniture and goods, Java applets displaying clothes on live mannequins, videos of sports and animation holiday resorts, before they make a purchase decision on-line;

pre-view sites where people may pre-view audio/video contents before they buy on-line and are webcast delivered.

Figure 6:
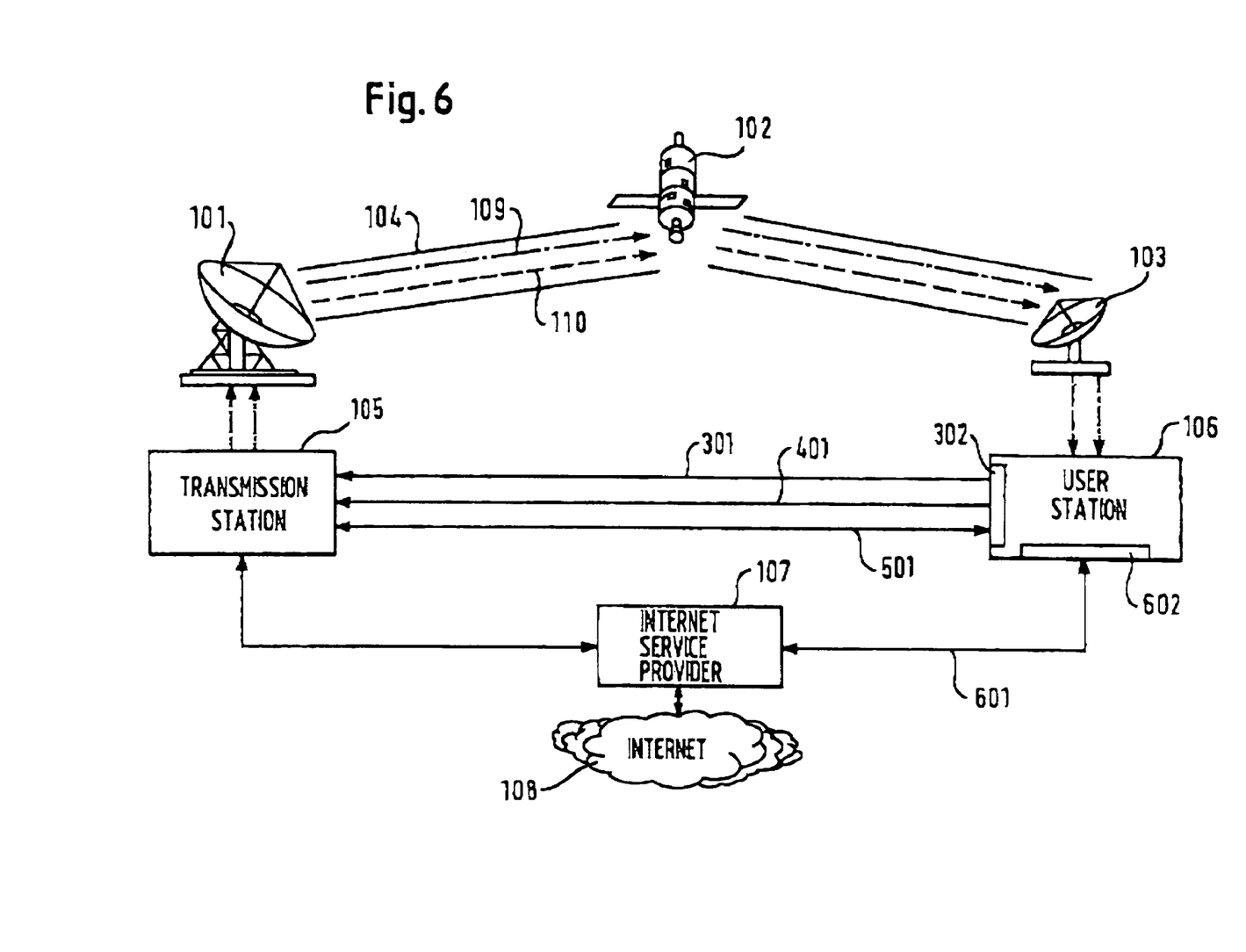
FIG. 6 shows a schematic diagram of a fifth embodiment of the invention.

FIG. 6 shows a schematic diagram of a fifth embodiment of the invention. The difference as to the fourth embodiment lies in the fact that there is an additional auxiliary channel 601 between the user station 106 and the Internet Service Provider 107. For this purpose, a modem 602 is provided in the user station 106. Naturally, the modems 302 and 602 can be merged to a single modem. The auxiliary channel enables an alternative access to the Internet 108, if the required Internet page is not available in the cache of the user station or is ready to be fetched from the contents channel 109. The local advisor application, which is installed in the user station, allows a smooth switching between surfing in the local cache of the user station and on-line surfing in the Internet 108 via the auxiliary channel 601. When an Internet page is not stored locally in the cache, the local advisor application may chose either to fetch it immediately from the Internet via the auxiliary channel 601 or "vote" for it via the voting channel 401 and wait for the next webcasting round and watch the content at the speed of disc access.

Figure 7:
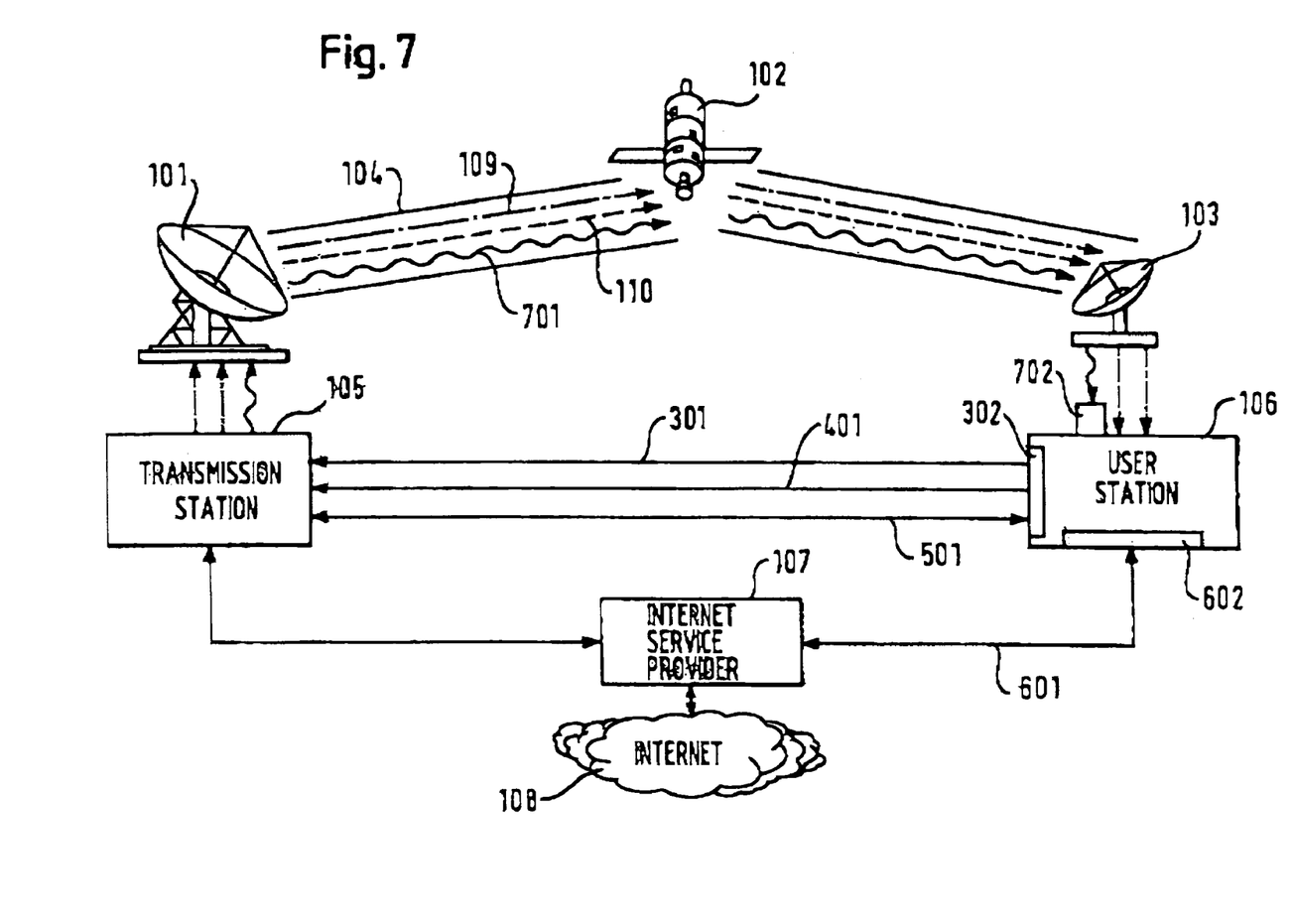
FIG. 7 shows a schematic diagram of a sixth embodiment of the invention.

FIG. 7 shows a schematic diagram of a sixth embodiment of the invention. The difference with regard to the fifth embodiment lies in the fact that the transmission channel 104 comprises additionally a service channel 701 which can be received by a "set-top box" 702 by the user station 106. The data of the service channel 701 are encoded such that only a user having a set-top box 702 is able to receive the data of the service channel 701. The service channel 701 together with the contents channel 109 provides a combination of free services and paid services, which can be accessed on demand by the user.

All in all, the invention provides a multi-cast common architecture, allowing several levels of sophistication of usage. The different levels can be summarized as follows:

- level 1 (free): the user watches passively webcast programs received by satellite, selecting among programs defined by other users (the voters);
- level 2 (free): the user becomes active and surfs the web by low-speed lines or connects and votes to influence the contents of the satellite webcasting;
- level 3 (free and paid): the user acquires sophisticated consumer habits and buys or auctions for satellite content delivery, does e-commerce based on information webcasted;
- level 4 (free and paid): the user is now familiar enough with the benefit of content push that he/she accepts dedicated set-top box push distribution with any combination of services, including pay-per-view video.

Each stage builds the user base for the next stage. At any given moment, the user is free to adopt a behaviour of one or other levels. At any level the user must feel that all the commercial factors introduced at this level are there to bring an added value.

Level 1 attracts the consumer by offering free reception of most popular Internet pages. Level 2 averages the growing consumer space and satisfies a need by offering (always for free) the possibility to vote and influence the choice and broadcast the most popular Internet pages. Level 3 is reached when the user feels that he has sufficiently of free services so that, occasionally, it is acceptable and convenient to pay to get some dedicated services. Eventually, level 4 applies when the three previous stages are wide-spread accepted. If this is reached, it becomes natural to the consumer to accept a more thorough form of webcasting in form of a multimedia set-top box.

Figure 8:
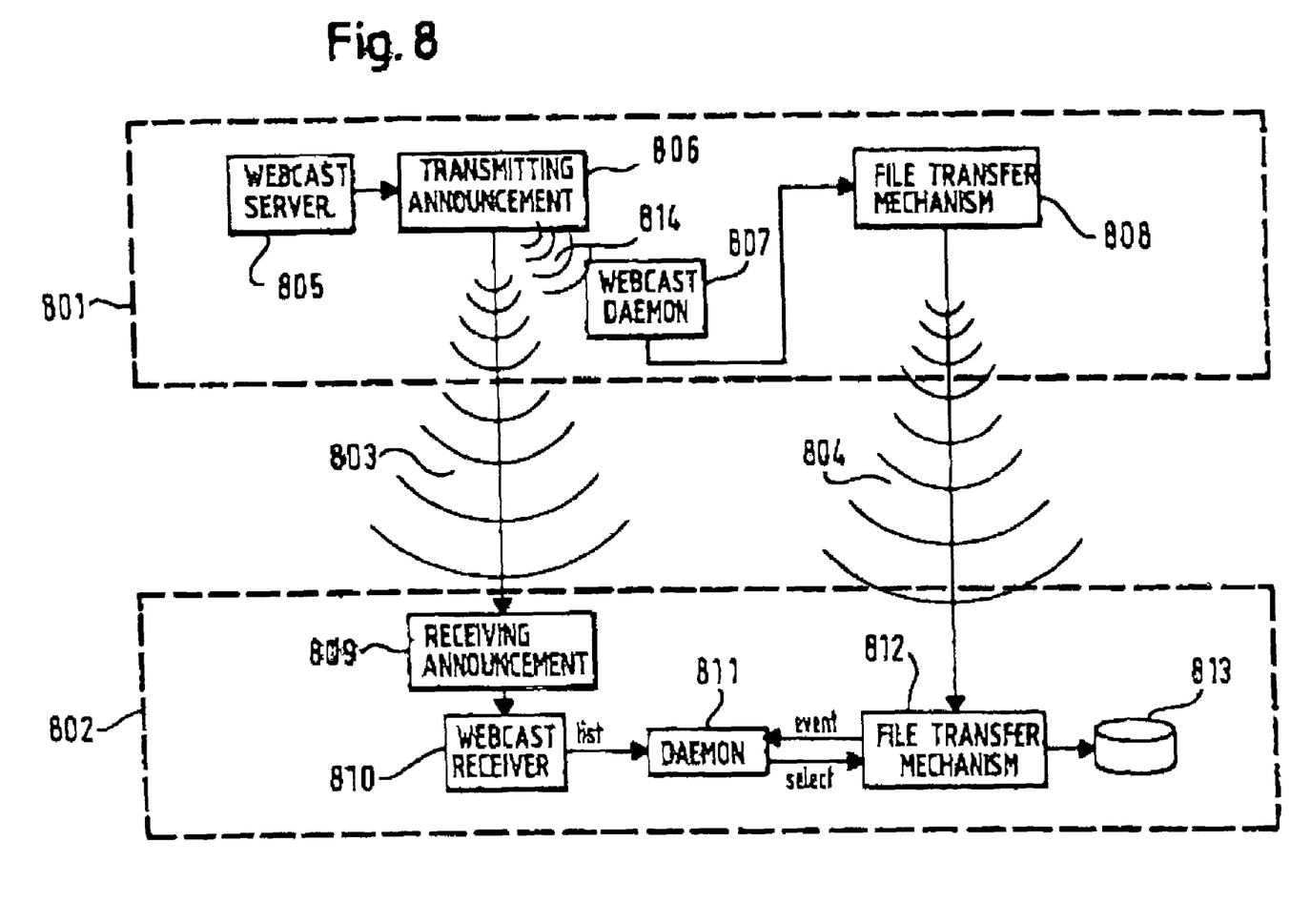
FIG. 8 shows a schematic diagram of components related to the transmission channel.

FIG. 8 shows a schematic diagram of components related to the transmission channel. Signals are transmitted from the transmission station 801 via the contents channel 803 and the announcement channel 804 to the user station 802. The transmission station comprises a webcast server 805, a means for transmitting the announcement 806, a webcast daemon 807 and a means for transferring the Internet files 808. Between the transmitting announcement 806 and the webcast daemon 807 is an arbitrary datalink 814, which might be wireless. The user station comprises a means for receiving the anouncements 809, a webcast receiver 810, a daemon 811, a file transfer mechanism 812 and a data storage 813.

The file transfer mechanism 808 can be one of the many mechanisms that are available on the market or in the literature. Usually, these mechanisms simply broadcast any files that are put in a given directory by the webcast daemon 807, which is controlled by the announcement data (as does Microsoft Netshow®). Some others may carry a more elaborate file announcement process with a list of intended receivers, to allow the receivers to prepare themselves for reception (as does StarBurst's MFTP). The implementation uses a simple implementation that follows the TFTP protocol that is described on the Internet in a freely available document.

The means for transmitting announcement data 806 comprises modules doing the announcement of the multicast session, describing among others the next webcast rounds. The announcement uses the XML (eXtended Markup Language) syntax, in order to allow for flexibility in the content of the announcement and keep a common denominator between several future webcasters/broadcasters. In order to be compatible with as many file transfer mechanisms as possible without doing extensive modifications to support each of them and still take advantage of the global announcement, daemons are used. These daemons are specific to each file transfer mechanism. They will listen to the announcements and react accordingly by feeding the file transfer applications with the commands they expect to receive.

The scenario is as follows:

The webcasting server 805 prepares a list of Web objects to webcast and creates the necessary files and instructions for the global announcement.

The global announcement 806 multicasts the coming files as a series of SDP messages, containing also the keywords to characterize a group of files that are logically related (for example HTML's and GIF's of a same web page).

The webcasting server daemon 807 that is specific to a file transfer tool listens to the global announcement and prepares the job to be fed to this file transfer tool 808. Each different file transfer tool may use its own announcement mechanism to transfer files individually or as a group.

On the client, the global announcement listener 809 is warned of the coming file transfer session and feeds the characteristics to the webcast receiver.

The webcast receiver 810 is a smart application with a screening logic and cache refresh logic (for example, "first-in-first-out" or "least recently used") that decides what session to listen to and to retain for local storage.

A daemon 811 will consult this list and watch events from the file transfer tool 812 signaling the occurrence of a session, it compares with the list and decides whether to ignore the file(s) or not.

The file transfer tool will receive and store the files in the file storage 813 or will discard the files.

The implementation of the announcement channel uses the formal description of the XML, which is a DTD (Document Type Description).

The following is an example. The content may vary depending on the depth of the characterization of the announcement.

```
<BOOKING>
    <CLASSIFICATION_UPDATE>
        <CLASSIF_KWD></CLASSIF_KWD>
        <CLASSIF_KWD></CLASSIF_KWD>
    </CLASSIFICATION_UPDATE>
    <PACKAGE>
    <INDEX_FILE_LOCATION>
    </INDEX_FILE_LOCATION>
        <CHANNEL_AGGR_ID>
        </CHANNEL_AGGR_ID>
        <ROOT_URL></ROOT_URL>
        <LEVEL_NUMBER></LEVEL_NUMBER>
        <ROOT_MD5></ROOT_MD5>
        <UPDATE_INFO>
            <UPDATED></UPDATED>
            <PREFETCHING_TIME>
            </PREFETCHING_TIME>
    <LAST_PACK_UPDATE_TIME>
    </LAST_PACK_UPDATE_TIME>
        </UPDATE_INFO>
        <CLASSIFICATION>
            <CLASSIF_KWD></CLASSIF_KWD>
            . . .
            <CLASSIF_KWD></CLASSIF_KWD>
        </CLASSIFICATION>
        <PROFILE>
            <PROFILE_KWD>
```

-continued

```
        <PROFILE_KWD_NAME>
        </PROFILE_KWD_NAME>
    <PROFILE_KWD_WEIGHT>
    </PROFILE_KWD_WEIGHT>
        </PROFILE_KWD>
        ...
        <PROFILE_KWD></PROFILE_KWD>
    </PROFILE>
    <SESSION>
        <OBJECT>
            <OBJECT_URL></OBJECT_URL>
            <OBJECT_FILENAME>
            </OBJECT_FILENAME>
            <OBJECT_MD5></OBJECT_MD5>
            <OBJECT_SIZE></OBJECT_SIZE>
            <OBJECT_TIME></OBJECT_TIME>
            <ENCRYPTION></ENCRYPTION>
            <ERROR_REPORT></ERROR_REPORT>
        </OBJECT>
        ...
        <OBJECT></OBJECT>
    </SESSION>
</PACKAGE>
...
<PACKAGE></PACKAGE>
</BOOKING>
```

Figure 9:
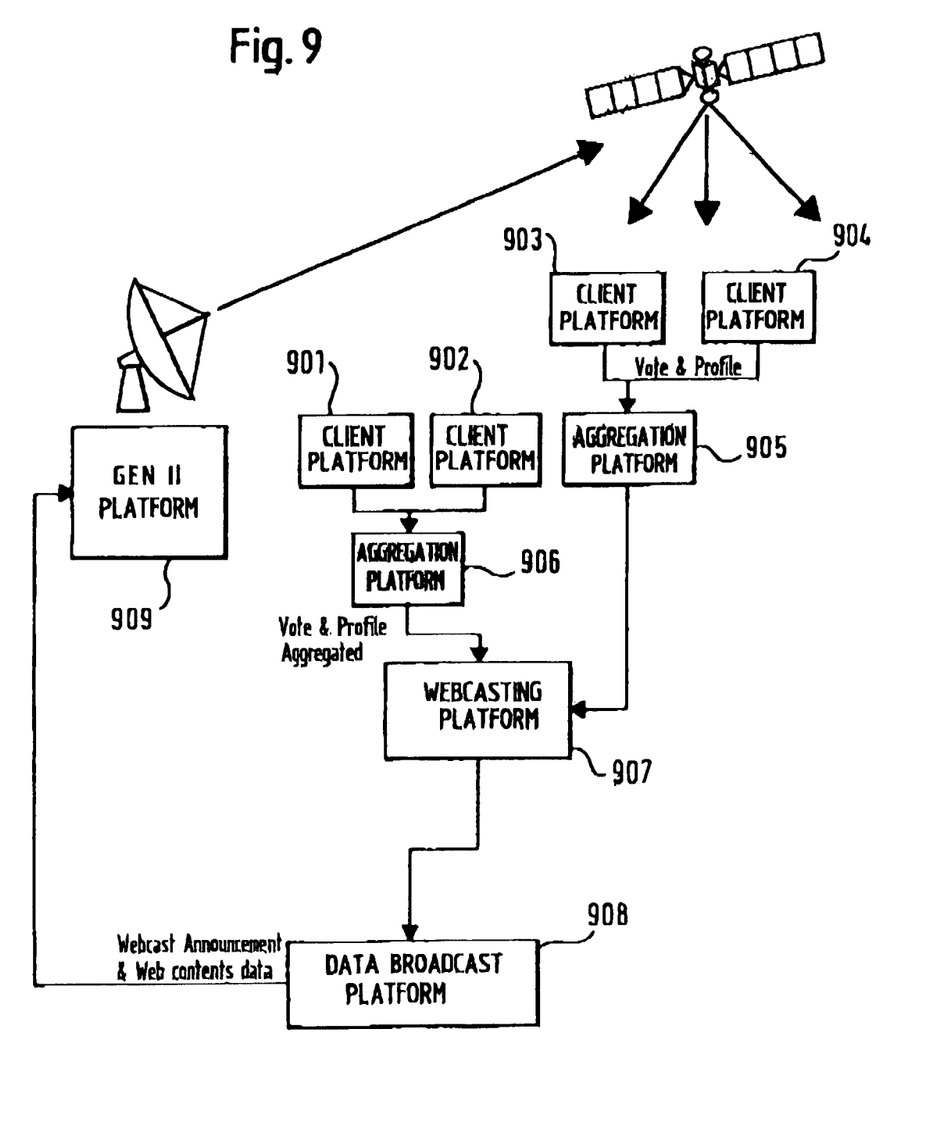
FIG. 9 shows a schematic diagram of components related to the return channel.

FIG. 9 shows a schematic diagram of components related to the return channel. The transmitted data via the transmission channel are received by a plurality of user stations 901, 902, 903 and 904. The voting messages together with the profile of each user are aggregated by aggregation platforms 805, 906 and are collected at the webcasting platform 907, which communicates with the data broadcast platform 908. The transmission again via satellite is already described above.

In particular, a voting mechanism is implemented on the return channel. The voting mechanism is the counterpart of the announcement. It allows the end-customer to "announce" to the webcaster what are his own preferences, in an anonymous manner or a weighted manner. Thus, the webcaster may decide which contents are of interest to the most people and deserves priority to be webcast.

This voting mechanism is used to carry the vote from the end-user back to the voting aggregator (usually his Internet Service Provider) to influence the webcasting content. It also carries the hit-reporting for successfully visited web pages. As such, its use is not mandatory when the end-user wishes only to "watch" anonymously the webcasting. The vote carries the profile of the user, to give more weight to voters who have centers of interests that are close to the topics addressed by a web site. It also carries the hit reporting counts, that is a fair practice when delivering cached contents.

This end-user voting protocol uses a TCP/IP return link between the end-user and his Internet Service Provider. The design of the protocol does not force the transport used by the vote aggregator. This transport could be either by FTP or (more securely) an SSL certificate-protected HTTP session. The concern is not to be able to identify and track the user voter but rather to obtain a non-repudiation status of the vote, and thus track repeated votes, virus votes, intrusion votes, etc.

This vote is sent to the Internet Service Provider that the user is subscribed to, who is in charge of collecting the votes and forwarding the selected popular URL to the cache pre-fetch platform as soon as possible, to be weighted and aggregated for the next webcasting round. This Internet Service Provider is also responsible of adjusting the displays profiles of the advertisement banners and of uploading to the advertisement insert platform these ad banners (with their display profiles). It is very important to note that the individual user profiles should remain within the Internet Service Provider premises, and not used for anything else, in order to comply with legal rules under the most restrictive German laws.

For maximum flexibility, the voting process is designed in such a way that it supports many levels of aggregation: the end-user may vote to his local Internet Service Provider (or his school or college) that may sum the votes up and forward them to a regional Internet Service Provider. The latter may again weight, sum and forward up any number of levels before coming to the pre-fetch platform. The pre-fetch platform will finally aggregate the votes and decide on the resulting popularity score of each URL. The voting algorithm supports an open number of levels as follows. The simplest voting scheme would be to sum the number of times that a URL has been requested, to count its popularity. However, this would be able to discriminate only the scoring of homepages of the most well known sites. If the webcasting mechanism acts on the inner pages of these popular sites, or if it acts on sites of very specific interest, we will observe most of the time a tie situation where all of them received only one or two votes and it would be no clear criteria to favor webcasting one rather than another. To allow for more discriminant voting, a natural solution would be to weight the index of a URL with the profile of a voter (a vote from a football fan to webcast "Ajax Amsterdam" would have more weight than a same vote from a hockey player). Using a mathematical formalism, let U be the index vector of a URL, $P_i$ be the personal profile vector of a voter i, n be the number of voters, then, S the summed voting score of a URL, in the simplest voting case, would be $$S=\Sigma i$$

In the weighted voting case, S the summed voting score of a URL would be $$S=\Sigma U.P_i$$

The multiplication shown here is a scalar product. Since the URL is the same for all voters, the formula may also be written as $$S=U.\Sigma.P_i$$

This formula shows that each level of Internet Service Provider should simply do a vector sum of the voters' profiles. The pre-fetch platform would fetch the URL content, index it and use the index to calculate the final score, to decide whether the URL is of enough interest to be cached and how frequently it should be webcast.

The current implementation of the voting channel uses the same XML principles to wrap the votes. The following is an example. The content may vary depending on the depth of the characterization of the announcement.

```
<VOTE_FILE>
    <VOTE_TYPE></VOTE_TYPE<
    <URL_LIST>
        <UI></UI>
        ...
        <UI></UI>
    </URL_LIST>
    <USER>
        <CLASSIFICATION>
            <CLASSIF_KWD></CLASSIF_KWD>
            ...
```

```
            <CLASSIF_KWD></CLASSIF_KWD>
        </CLASSIFICATION>
        <PROFILE>
            <PROFILE_KWD>
                <PROFILE_KWD_NAME></
                PROFILE_KWD_NAME>
                <PROFILE_KWD_WEIGHT></
                PROFILE_KWD_WEIGHT>
            </PROFILE_KWD>
            ...
            <PROFILE_KWD></PROFILE_KWD>
        </PROFILE>
    </USER>
</VOTE_FILE>
```

The invention claimed is:

1. A system for distributing data subsets from a transmission station (105, 801) to a plurality of user stations (106, 802) over a transmission channel (104) having a predetermined bandwidth and comprising a contents channel (109, 804) and an announcement channel (110, 803), the transmission station (105, 801) comprising a data link (814) between the announcement channel (110, 803) and the contents channel (109, 804) and comprising a server (805), which is arranged to prepare a list of said data subsets to be transmitted and which is arranged to create for each data subset of said data subsets an index containing a description of a corresponding data subset, wherein each index is transmitted over the announcement channel (110, 803) and each corresponding data subset is transmitted over the contents channel (109, 804), and means for controlling via the data link (814) said transmission of the corresponding data subset over the contents channel (109, 804) in response to each index being transmitted over the announcement channel (110, 803) such that each index of the announcement channel (110, 803) is a description of a future data subset to be transmitted over the contents channel (109, 804), each of the plurality of user stations comprising a local advisor application (810, 811, 812), a means for receiving the indices (809) and a means for receiving the data subsets (812) and a local storage (813), wherein for each data subset the index containing a description of said corresponding data subset is received by the means for receiving the indices (809) from the announcement channel (110, 803), wherein the local advisor application (810, 811, 812) is arranged to appoint a user profile specifying data subsets of interest to a user and is arranged to download said data subsets from the contents channel via the means for receiving the data subsets (812) to the local storage (813) in accordance with a predetermined quality of matching between each corresponding index and the user profile.

2. The system according to claim 1, wherein a payment channel is provided between at least some of the user stations and the transmission station.

3. The system according to claim 2, wherein an evaluation unit is provided in the transmission station for evaluating a certain payment.

4. The system according to claim 3, wherein a vote channel is provided from at least some of the user stations to the transmission station for enabling the user to transmit a vote for a specific data subset to the transmission station and wherein a vote related payment gives a specific vote of the user priority over free votes.

5. The system according to claim 3, wherein a vote channel is provided from at least some of the user stations to the transmission station for enabling the user to transmit a vote for a specific data subset to the transmission station, wherein the transmission station comprises a selection unit which is arranged to include incoming votes in a competition process for bandwidth selection of the contents channel such that those of said data subsets are transmitted over the contents channel which are of interest to a maximum number of users and wherein a bandwidth related payment decreases a transmission delay for voted data subsets to be transmitted.

6. The system according to claim 2, wherein the payment channel is a telephone line or an Internet connection.

7. The system according to claim 1, wherein a return channel is provided from at least some of the user stations to the transmission station for enabling a corresponding user to exchange data interactively.

8. The system according to claim 1, wherein the return channel is a telephone line or an Internet connection.

9. The system according to claim 7, wherein a vote channel is provided from at least some of the user stations to the transmission station for enabling the user to transmit a vote for a specific data subset to the transmission station and wherein the vote channel is part of the return channel.

10. The system according to claim 7, wherein a payment channel is provided between at least some of the user stations and the transmission station and wherein the payment channel is part of the return channel.

11. The system according to claim 1, wherein an auxiliary channel is provided for alternatively distributing data to a user station, which cannot be distributed over the transmission channel due to limited bandwidth.

12. The system according to claim 11, wherein the auxiliary channel is a telephone line or an Internet connection.

13. The system according to claim 11, wherein the local advisor application manages the data access for those of said data subsets already downloaded from the transmission channel to the local storage, for those of said data subsets announced in the index ready to be downloaded in the future and said data to be downloaded from the auxiliary channel.

14. The system according to claim 11, wherein the local advisor application updates continuously the user profile on a basis of keywords which have been recently used for a search in the Internet via the auxiliary channel.

15. The system according to claim 1, wherein a vote channel is provided from at least some of the user stations to the transmission station for enabling the user to transmit a vote for a specific data subset to the transmission station.

16. The system according to claim 15, wherein the transmission station comprises a selection unit which is arranged to include incoming votes in a competition process for bandwidth selection of the contents channel such that those of said data subsets are transmitted over the contents channel which are of interest to a maximum number of users.

17. The system according to claim 15, wherein the vote channel is a telephone line or an Internet connection.

18. The system according to claim 1, wherein the transmission channel comprises a service channel, which connects an encoder in the transmission station and a decoder in a user station.

19. The system according to claim 18, wherein the service channel is accessible after a certain payment for requesting and/or receiving on-demand services.

20. The system according to claim 1, wherein the transmission channel is a satellite broadcast channel.

21. The system according to claim 1, wherein the index of the announcement channel is based on a syntax of the extended markup language.

22. The system according to claim 1, wherein the data subsets to be distributed are Internet data and/or multimedia data.

23. The system according to claim 1, wherein each user station is a computer comprising a receiving equipment for receiving the transmission channel.

24. The system according to claim 1, wherein the transmission station is connected to an Internet Service Provider which gives access to Internet data.

25. The system according to claim 1, wherein the index contains information for estimating a delay of transmission to a next data subset.

26. The system according to claim 1, wherein the local advisor application updates continuously the user profile on a basis of keywords which have been recently used for a search in the local storage of the user station and/or in the index of the announcement channel.

27. The system according to claim 1, wherein the predetermined quality of matching is determined by a proximity measurement in a multi-dimensional vector space between the user profile and the index, wherein both the user profile and the index are represented by a point in the multi-dimensional vector space whose coordinates are given by a set of key words and wherein for each index being inside a predetermined proximity the corresponding data subset is downloaded from the contents channel to the local storage.

28. A method for transmitting data subsets from a transmission station (105, 801) to a plurality of user stations (106, 802) over a transmission channel (104) having a predetermined bandwidth and comprising a contents channel (109, 804) and an announcement channel (110, 803),
wherein between the announcement channel (110, 803) and the contents channel (109, 804) a data link (814) is provided, comprising
preparing a list of said data subsets to be transmitted and creating for each data subset of said data subsets an index containing a description of a corresponding data subset, wherein each index is transmitted over the announcement channel (110, 803) and each corresponding data subset is transmitted over the contents channel (109, 804), and wherein said transmission of the corresponding data subset over the contents channel (109, 804) is controlled via the data link (814) in response to each index being transmitted over the announcement channel (110, 803) such that each index of the announcement channel (110, 803) is a description of a future data subset to be transmitted over the contents channel (109, 804).

29. A method for receiving data subsets transmitted according to the method of claim 28, further comprising
receiving for each corresponding data subset an index containing a description of said corresponding data subset from the announcement channel (110, 803),
appointing a user profile specifying data subsets of interest to a user and downloading said data subsets from the contents channel to the local storage (813) in accordance with a predetermined quality of matching between each corresponding index and the user profile.

30. A user station for managing reception of data subsets transmitted according to the method of claim 28,
wherein the data subsets are received from the contents channel (109, 804) and for each data subset of said data subsets an index containing a description of a corresponding data subset is received from the announcement channel (110, 803), and wherein each index received from the announcement channel (110, 803) is a description of a future data subset to be received from the contents channel (109, 804),
the user station comprising a local advisor application (810, 811, 812), a means for receiving the indices (809) and a means for receiving the data subsets (812) and a local storage (813), wherein for each data subset the index containing a description of said corresponding data subset is received by the means for receiving the indices (809) from the announcement channel (110, 803), wherein the local advisor application (810, 811, 812) is arranged to appoint a user profile specifying data subsets of interest to a user and is arranged to download said data subsets from the contents channel via the means for receiving the data subsets (812) to the local storage (813) in accordance with a predetermined quality of matching between each corresponding index and the user profile.

31. A transmission station for transmitting data subsets to a plurality of user stations (106, 802) over a transmission channel (104) having a predetermined bandwidth and comprising a contents channel (109, 804) and an announcement channel (110, 803),
the transmission station (105, 801) comprising a data link (814) between the announcement channel (110, 803) and the contents channel (109, 804) and comprising a server (805), which is arranged to prepare a list of said data subsets to be transmitted and which is arranged to create for each data subset of said data subsets an index containing a description of a corresponding data subset, wherein each index is transmitted over the announcement channel (110, 803) and each corresponding data subset is transmitted over the contents channel (109, 804), and means for controlling via the data link (814) said transmission of the corresponding data subset over the contents channel (109, 804) in response to each index being transmitted over the announcement channel (110, 803) such that each index of the announcement channel (110, 803) is a description of a future data subset to be transmitted over the contents channel (109, 804).

32. A method for distributing data subsets from a transmission station (105, 801) to a plurality of user stations (106, 802) over a transmission channel (104) having a predetermined bandwidth and comprising a contents channel (109, 804) and an announcement channel (110, 803), wherein between the announcement channel (110, 803) and the contents channel (109, 804) a data link (814) is provided, comprising
preparing a list of said data subsets to be transmitted and creating for each data subset of said data subsets an index containing a description of a corresponding data subset, wherein each index is transmitted over the announcement channel (110, 803) and each corresponding data subset is transmitted over the contents channel (109, 804), and wherein said transmission of the corresponding data subset over the contents channel (109, 804) is controlled via the data link (814) in response to each index being transmitted over the announcement channel (110, 803) such that each index of the announcement channel (110, 803) is a description of a future data subset to be transmitted over the contents channel (109, 804),
receiving for each corresponding data subset an index containing a description of said corresponding data subset from the announcement channel (110, 803), appointing a user profile specifying data subsets of interest to a user and downloading said data subsets from the contents channel to the local storage (813) in accordance with a predetermined quality of matching between each corresponding index and the user profile.

* * * * *

UNITED STATES PATENT AND TRADEMARK OFFICE
CERTIFICATE OF CORRECTION

PATENT NO.          : 7,152,098 B2                                      Page 1 of 1
APPLICATION NO. : 10/409737
DATED                  : December 19, 2006
INVENTOR(S)         : Vu Tien Khang It is certified that error appears in the above-identified patent and that said Letters Patent is hereby corrected as shown below:

Column 12
Claim 8, line 19, delete "claim 1", insert --claim 7--

Claim 13, line 36, delete "the data access", insert --data access--.

Signed and Sealed this

Third Day of April, 2007

JON W. DUDAS
*Director of the United States Patent and Trademark Office*